(12) United States Patent  
Roberts et al.

(10) Patent No.: US 8,103,070 B2  
(45) Date of Patent: Jan. 24, 2012

(54) VOLUME RENDERING APPARATUS AND METHOD

(75) Inventors: Colin Roberts, Edinburgh (GB); Sebastian Meller, Edinburgh (GB)

(73) Assignee: Toshiba Medical Visualization Systems Europe, Limited, Edinburgh (GB)

( * ) Notice: Subject to any disclaimer, the term of this patent is extended or adjusted under 35 U.S.C. 154(b) by 1066 days.

(21) Appl. No.: 11/944,448

(22) Filed: Nov. 22, 2007

(65) Prior Publication Data

US 2009/0136106 A1 May 28, 2009

(51) Int. Cl.
*G06K 9/00* (2006.01)
(52) U.S. Cl. .......................... 382/128; 382/154
(58) Field of Classification Search .................. 382/128, 382/154
See application file for complete search history.

(56) References Cited

U.S. PATENT DOCUMENTS

| | | | |
|---|---|---|---|
| 5,971,767 A * | 10/1999 | Kaufman et al. | 434/267 |
| 7,324,104 B1 * | 1/2008 | Bitter et al. | 345/420 |
| 2005/0281447 A1 | 12/2005 | Moreau-Gobard et al. | |
| 2008/0270095 A1 * | 10/2008 | Lombaert et al. | 703/11 |

FOREIGN PATENT DOCUMENTS

| | | |
|---|---|---|
| EP | 0981109 | 2/2000 |
| EP | 1482470 | 12/2004 |
| EP | 1 832 233 A1 | 9/2007 |
| JP | 2002-140690 | 5/2002 |

OTHER PUBLICATIONS

Saito et al., "Real-time four-dimensional imaging of heart with multi-detector row CT", Radiographics, Oct. 2002, 7 pages.
Lorensen et al., "The exploration of cross-sectional data with a virtual endoscope", Interactive Technology and the New Paradigm for Healthcare, Jan. 1995, 10 pages.
International Search Report for corresponding application No. PCT/GB2008/003799 dated Aug. 27, 2009.
Crum W.R., Hill D.L.G.H. and Hawkes D.J., "Information Theoretic Similarity Measures in Non-Rigid Registration" Proceedings of Information Processing in Medical Imaging 2003, LNCS 2732, pp. 378-387, ISBN 3-540-40560-7, ISSN 0302-9743, Editors, C. Taylor and J.A. Noble.

* cited by examiner

*Primary Examiner* — Tom Y Lu
(74) *Attorney, Agent, or Firm* — Renner, Otto, Boisselle & Sklar, LLP (57) ABSTRACT

Volume rendering of images of four dimensional (4D) heart image data, in particular cardiac CT data by slab multiplanar reformatting (MPR), is improved by providing an automated method and apparatus for determining and locking onto anatomically relevant viewing parameters. In particular the view plane, view axis and view orientation are changed from frame to frame in the movie so they remain fixed to an anatomical feature of interest, thereby providing a stable movie of the heart feature of interest. Provision of a dynamic view plane compensates not only for translational motion of the heart feature of interest, but also for its tilting and twisting. Tilting effects are highly significant when viewing heart valves, since the valve plane exhibits varying angles of tilt through the heart phases as a result of the generally tubular arteries and veins exhibiting a bending motion.

24 Claims, 11 Drawing Sheets

VOLUME RENDERING APPARATUS AND METHOD

BACKGROUND OF THE INVENTION

The invention relates to volume rendering, in particular to multi-planar reformatting (MPR) using a computer system that includes a graphics processing unit (GPU).

Volume rendering is the standard visualization method for viewing two-dimensional (2D) representations of three-dimensional (3D) data sets and is widely used in medical imaging. MPR volume rendering is a standard rendering method for processing 3D data sets collected by medical imaging equipment, such as computer-assisted tomography (CT) scanners, magnetic resonance (MR) scanners, ultrasound scanners and positron-emission-tomography (PET) systems. These 3D data sets are sometimes referred to as volume data. General background on volume rendering can be found in the text book Lichtenbelt, B., Crane, R. and Naqvi, S., "Introduction to Volume Rendering", Hewlett-Packard Company, Prentice-Hall PTR, New Jersey, 1998 [1].

Medical image data sets are generally large. Sizes of between 0.5 Gigabytes and 8 Gigabytes are not uncommon. For example, a medical image data set might comprise 1024× 1024×1024 16-bit voxels which corresponds to approximately 2 Gigabytes of data. From this an image comprising 1024×1024 16-bit pixels might be rendered.

Current CT scanners are being developed to allow so-called four-dimensional (4D) imaging, where the fourth dimension is time. In other words, the CT scanners are providing 3D images as a function of time. The goal is to allow real-time viewing in 3D. Imaging of the heart, cardiology, is an important application, where it is desired to view the beating heart of a patient. Current state of the art CT scanners are not able to record a full cycle of the heart in one take. Instead, different phases of the heart beat are recorded in different beats, and the images stitched together, for example out of 3 or 4 different heart beats, to give the impression of imaging in real time. Within the next few years CT scanners are expected to become commercially available that will allow a full single beat of the heart to be acquired in one take. This will be made possible through the use of dual source CT scanners and scanners that increase from the present 64 slice standard to 256 slices. The rendered images to be viewed by a user as a movie or cine typically need a frame rate of at least 10 frames per second (fps), preferably 20 or 30. It is also preferable if cines can be generated and displayed in real time. Similar developments are taking place in MR scanners and also ultrasound and other scanner types.

With these great advances in machine capability, advances in the rendering is also required. Specifically, while the heart is undoubtedly one of the most important organs to visualize in 4D so that its complex motions can be studied by a clinician, these complex motions present particular challenges for the rendering. The vigorous motion of the heart induced by its beating causes it to move around inside the patients body and also dilate (diastole) and contract (systole). A rendered image of a 4D) CT scan can thus be indistinct and of only limited use to a clinician.

Some work has been done in numeric processing of 3D images to enable automatic identification and characterization of principal heart features, in particular aortic and mitral valves.

EP 1 832 233 A1 [2] discloses a method for processing 3D echochardiac, i.e. ultrasound, data in order to measure performance characteristics of a mitral valve. The method uses a replica exchange and simulated annealing techniques, but is based on an initial manual identification by a user of the positions of the mitral valve annulus and leaflets on each individual data slices before processing can take place.

US 2005/0281447 A1 [3] relates to 3D imaging and provides a computationally efficient method of finding the location of an aortic valve from a CT volume data set. A slice is taken through the aorta, and the aorta located in the slice. The aorta is then followed down towards the aortic valve, the position of which is detected by a sudden reduction in the measured diameter of the aorta.

JP 2002-140690 [4] discloses an automated method for examining a heart valve that can be applied to ultrasound, CT or other volume data sets. The valve shape is determined from the 3D image using an doughnut-shaped search shape which is multiply axially sectioned. The method is extended to 4D to allow the speed of motion, and acceleration, of the valve to be quantified, these dynamic data being useful for diagnosis. While this method extends to 4D, from what can be understood from the Japanese Patent Office machine translation into English, it does not involve any 4D rendering, rather only analysis of the change in position of the doughnut-like geometrical construct over time.

It appears from our searching that there is still a general lack of available methods and associated apparatus to allow high quality volume rendering in 4D of the heart, and in particular heart valves.

SUMMARY OF THE INVENTION

According to a first aspect of the invention, there is provided a computer implemented method of volume rendering a sequence of frames over time of volume data depicting heart motion, the method comprising: defining a heart feature of interest to view; pre-processing each of the frames of volume data to determine a view plane for each frame referenced on the heart feature of interest; rendering each of the frames of volume data with a viewing axis locked to its respective view plane determined by the pre-processing; and displaying the rendered frames as a movie where the frames are displayed referenced to the view axis.

It will be appreciated that the provision of a dynamic view plane compensates not only for translational motion of the heart feature of interest, i.e. up and down, side to side, but also for tilting effects. Tilting effects are highly significant for heart valves in particular, since the valve plane exhibits varying angles of tilt through the heart phases as a result of the generally tubular arteries and veins exhibiting a bending motion. For example, the variation of tilt angle of the aortic valve during a heart cycle may be about 15 degrees. The invention thus provides a method by which a clinician can view a stable image of a heart feature of interest, such as a valve, free of not only the blurring caused by lateral motion, but also the confusion caused by different parts of the feature of interest slipping into and out of the view plane as a result of tilting motion.

The terms movie and cine are not used exclusively to denote displaying the rendered images at a fixed frame rate, but also encompasses successive display of different frames under control of the user, for example a situation in which the user can page through frame by frame with the view locked to the feature of interest rather than merely the real space coordinate frame. One can envisage a user paging up and down through the heart phases to progress forwards or backwards in time using left and right mouse buttons, page-up and page-down keyboard keys or any other user interface devices. The underlying concept is for the user to be automatically provided with an anatomically referenced coordinate system, either referenced directly to the anatomical feature of interest to be viewed, or referenced to some related feature, such as a larger sub-region in which the feature is contained. The invention allows a user to view the feature of interest in a stable and consistent anatomical environment, free from the distortions that result when the visualization is referenced to the laboratory frame coordinate system, or the patient's body.

The invention can be generalized further to be defined as an automated method for determining anatomically relevant viewing parameters, in particular view plane, but also view axis and view orientation. This may not only be applied to 4D visualization, i.e. watching the change in a 3D data set over time, but may also be used for comparing 3D data sets taken of different patients, e.g. so that a view of the heart feature of interest of an anonymized healthy patient may be viewed alongside or overlaid with that of the patient being assessed, or the same patient before and after surgery, or during longer term monitoring of a given patient's condition.

Accordingly a second aspect of the invention provides a computer implemented method of volume rendering a plurality of sets of volume data depicting a heart, the method comprising: defining a heart feature of interest to view; pre-processing each of the sets of volume data to determine a view plane for each frame referenced on the heart feature of interest; rendering each of the frames of volume data with a viewing axis locked to its respective view plane determined by the pre-processing; and displaying the rendered frames together to allow their comparison where the frames are displayed referenced to the view axis.

The first and second aspects of the invention may be advantageously practiced in a number of specific ways, some of which are now described.

As well as the view plane, the pre-processing of each frame preferably also includes one or more further view parameters.

Specifically, the pre-processing of each frame may also determine a center point in the view plane for the heart feature of interest, and use this center point when rendering each frame to lock the view axis so that it intersects the view plane at the center point. Through this additional measure, the view of the valve or other heart feature or interest, in the movie is stabilized, and lateral motions of the feature are removed.

The pre-processing of each frame preferably also determines a view orientation in the view plane for the heart feature of interest, and uses this view orientation when rendering each frame to lock the view axis to the view orientation. In this way twists of the aorta or rotational motion of any other relevant feature which would otherwise cause rotational instability in the movie are compensated for.

Most preferably, the view plane, view axis and view orientation are all locked according to the invention.

The view parameters, such as the view planes, for the frames may be determined for each frame independently of the other frames with reference to the volume data for that frame. However, it is preferred that instead, the view parameters, such as view plane, are first determined for a frame selected having regard to phase of the feature or interest in the heart cycle, and then the view parameters for the other frames are determined through a registration process, preferably a non-rigid registration process. The registration process can be applied to one of: all the volume data; a subset of the volume data defining the heart; a subset of the volume data localized around the feature of interest.

If the feature of interest is a valve, the frame is preferably selected to be one in which the valve is shut, i.e. the leaflets are closed, or open.

The heart feature of interest may be automatically located with reference to a generally tubular structure of the heart, with the view plane being determined with reference to a geometrical feature of the generally tubular structure. Generally tubular structure is an artery or vein, in particular, the aorta (either side of the aortic arch), pulmonary artery, pulmonary vein, or superior or inferior vena cava. The heart feature of interest may be a heart valve. A preferred start frame of the movie can be selected by determining a frame in which the valve is closed, the start frame being determined from establishing a maximum deviation from a circular shape of the feature in the view plane.

The valve to be viewed may be the aortic valve in which case the view plane is preferably located at the plane of the aortic sinuses, which is found by finding a slice through the anterior aorta between the aortic arch and the aortic valve and then slicing down towards the aortic valve, with the slices following the curvature of the aorta, until a maximum in the slice area is found. This slice through the most bulky part of the aortic sinuses has a position and orientation, i.e. tilt angle, ideal for clear viewing. The view orientation can be determined by a line from the center point of the aortic sinuses and the radial direction of extent of a selected one of the aortic sinuses. In current implementations of the invention, the anterior-most one of the three aortic sinuses is used for the view orientation reference line.

The valve to be viewed may be the mitral valve, or the pulmonary valve, which is a tricuspid valve like the aortic valve.

When the valve to be viewed is the mitral valve, the view plane can be found by an extension of the method for finding the aortic valve view plane. Namely, first one finds a slice through the aorta between the aortic arch and the aortic valve and then iteratively slicing down towards the aortic valve, with the slices following the curvature of the aorta, until the slices rapidly increase in area indicating entrance of the left ventricle. Then one slices through the left ventricle transverse to the final aortic slice and slices down the left ventricle in a direction towards the patient's feet until the apex is found. One then slices back up the left ventricle past the aorta until a minimum in the slice area is found, and finding the center of gravity of this slice which indicates the center of the mitral valve. The view plane can then be defined as a plane containing the center of the mitral valve. The view plane for the mitral valve optionally also intersects the center of the aortic valve, or is a plane perpendicular thereto. This line can also be used to fix the view orientation.

The invention can be used with a wide range of volume rendering techniques, but it is envisaged to be widely used for multiplanar reformatting (MPR), in particular slab MPR, where the slab has an extent covering a range of distances above and/or below the view plane. Different types of MPR can be used, such as maximum, minimum or average signal value MPR. It is also preferred to use an inverted color table, since this produces the reverse contrast images familiar to clinicians from conventional X-ray images.

It will be appreciated that the invention although developed specifically with cardiac CT data in mind may also be applied to other cardiac imaging modalities, such as MR, PET and ultrasound, and to viewing of combinations of data types, e.g. CT and PET overlaid.

Further aspects of the invention provide: a computer program product comprising machine readable instructions for implementing the method of the invention; a computer configured to perform the method of the invention; and a computer system loaded with machine readable instructions for implementing the method of the invention.

A still further aspect of the invention provides an apparatus for volume rendering a sequence of frames over time of volume data depicting heart motion, the apparatus comprising: a central processing unit (CPU) coupled to a system memory storing the volume data; and a display, wherein the apparatus is operable to: (a) define a heart feature of interest to view; (b) load the volume data from system memory; (c) pre-process each of the frames of volume data using the CPU to determine a view plane for each frame referenced on the heart feature of interest; (d) render each of the frames of volume data with a viewing axis locked to its respective view plane determined by the pre-processing using the CPU; and (e) display the rendered frames as a movie on the display where the frames are displayed referenced to the view axis. It will be appreciated that the apparatus may be adapted so as to carry out the various specific forms of the invention as described above with reference to the first aspect of the invention, and as further described below in the detailed description.

Finally, it will be appreciated that the method of the second aspect of the invention may be adapted, where relevant, to carry out the various specific forms of the first aspect of the invention as described above, and as further described below in the detailed description.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
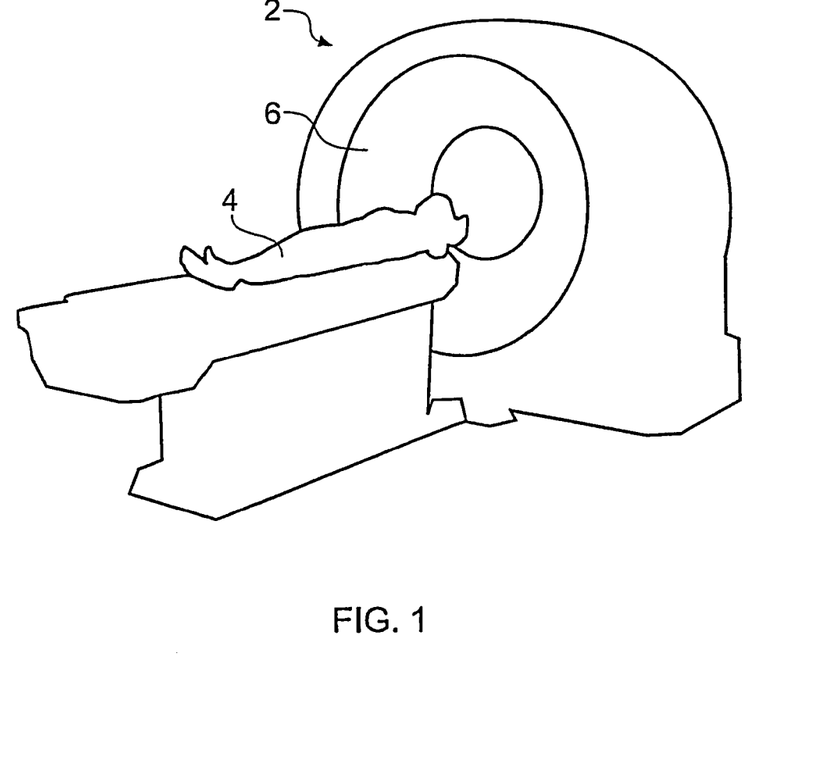
FIG. 1 shows a generic magnetic resonance scanner for generating volume data.

FIG. 1 is a schematic perspective view of a generic scanner 2, most especially a CT scanner, for obtaining a 3D scan of a region of a patient 4. An anatomical feature of interest (in this case the heart) is placed within a circular opening 6 of the scanner 2 and a series of image slices through the patient is taken. Raw image data are derived from the scanner and could comprise a collection of one thousand 2D 512×512 data subsets, for example. These data subsets, each representing a slice of the region of the patient being studied, are combined to produce volume data. The volume data comprise a collection of voxels each of which corresponds to a pixel in one of the slices. Thus the volume data are a 3D representation of the feature imaged and various user-selected 2D projections (output images) of the 3D representation can be displayed (typically on a computer monitor).

Different imaging modalities (e.g. CT, MR, PET, ultrasound) typically provide different image resolutions (i.e. voxel size), and the overall size of the volume imaged will further depend on the nature of the study. However, in the following description, by way of concrete example it will be assumed that the volume data comprise an array of 512×512×1024 16-bit voxels arranged on a regular Cartesian grid defined by x-, y- and z-axes, with the voxels being spaced by 0.5 mm along each axis. This corresponds to an overall imaged volume of around 25 cm×25 cm×50 cm, which is more than adequate to encompass the human heart and adjacent regions. As is conventional, the volume data are aligned with transverse, sagittal and coronal planes. The xy-axes are in a transverse plane, the xz-axes are in a coronal plane and the yz-axes are in a sagittal plane.

As noted above, a common technique for generating 2D output images from volume data is known as multi planar reformatting (MPR). MPR is a technique for presenting planar cross-sectional views through volume data to allow viewing of the data in any planar orientation. In zero thickness, or plane, MPR, output images are generated by sampling (typically involving interpolation) the volume data at locations corresponding to pixels in an output image plane passing through the volume data at a desired orientation and position. The specific mathematical processing applied to the volume data in order to generate such 2D images is well known and not described here.

A related form of MPR is known as MPR with thickness, or slab MPR. Slab MPR is often used where volume data are obtained on a grid which is denser than the image resolution required to be viewed by a user, to reduce noise, or to improve perception of anatomical structures in the data. In slab MPR, a planar slab of the volume data is identified which is parallel to the desired output image and which extends over a finite thickness in the vicinity of and perpendicular to the output image plane, i.e. along a viewing direction. The output image is obtained by collapsing this planar slab along the viewing direction according to a desired algorithm. Common collapse algorithms include determining the maximum, minimum or average signal value occurring for all voxels in the planar slab which project onto a single pixel in the output image. This signal value is then taken as the signal to be represented in the output image for that pixel. As with plane MPR, the mathematical processing applied to the volume data in order to generate slab MPR images is well known and not described here.

Figure 2:
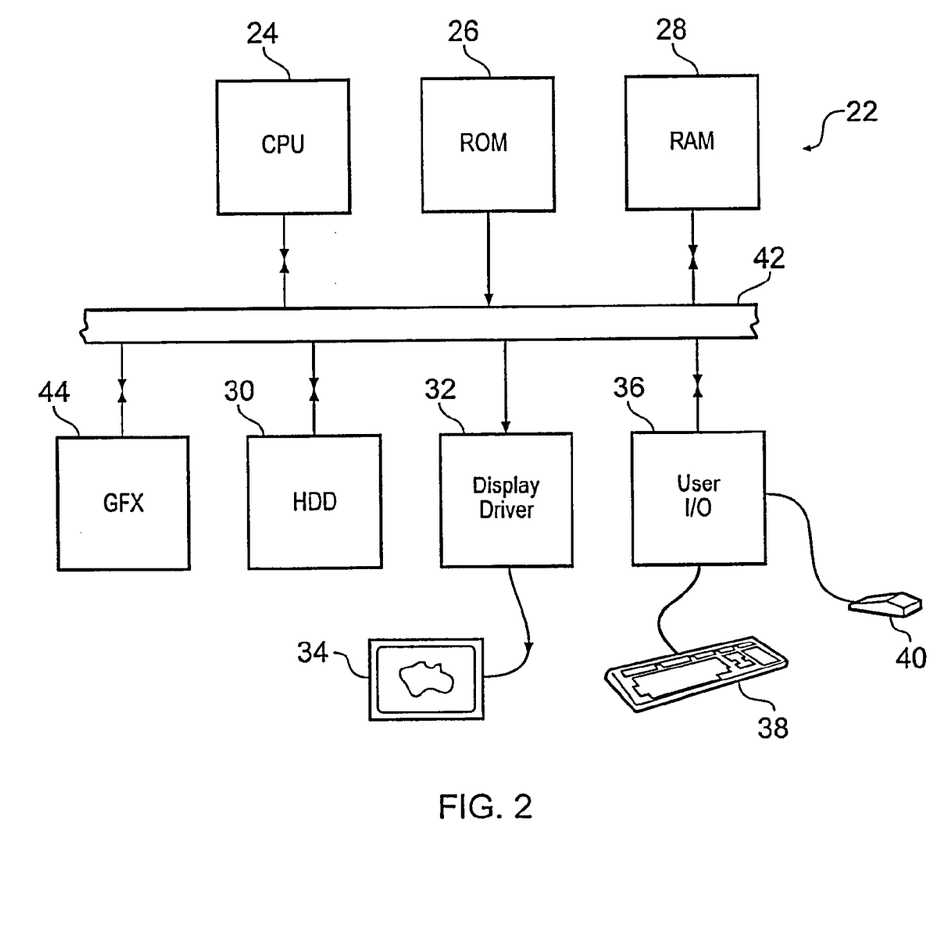
FIG. 2 schematically shows a general purpose computer system for processing volume data to generate two dimensional images in accordance with an embodiment of the invention.

FIG. 2 schematically illustrates a general purpose computer system 22 configured to perform processing of volume data to generate a cine of two dimensional images in accordance with an embodiment of the invention. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. In this example, the graphics card is a Radeon X800XT visual processing unit manufactured by ATI Technologies Inc., Ontario Canada. The graphics card includes a graphics processing unit (GPU) and random access memory tightly coupled to the CPU (CPU memory) (not shown in FIG. 2).

The CPU 24 may execute program instructions stored within the ROM 26, the RAM 28 or the hard disk drive 30 to carry out processing of signal values associated with voxels of volume data that may be stored within the RAM 28 or the hard disk drive 30. The RAM 28 and hard disk drive 30 are collectively referred to as the system memory. The GPU may also execute program instructions to carry out processing of volume data passed to it from the CPU.

Figure 3:
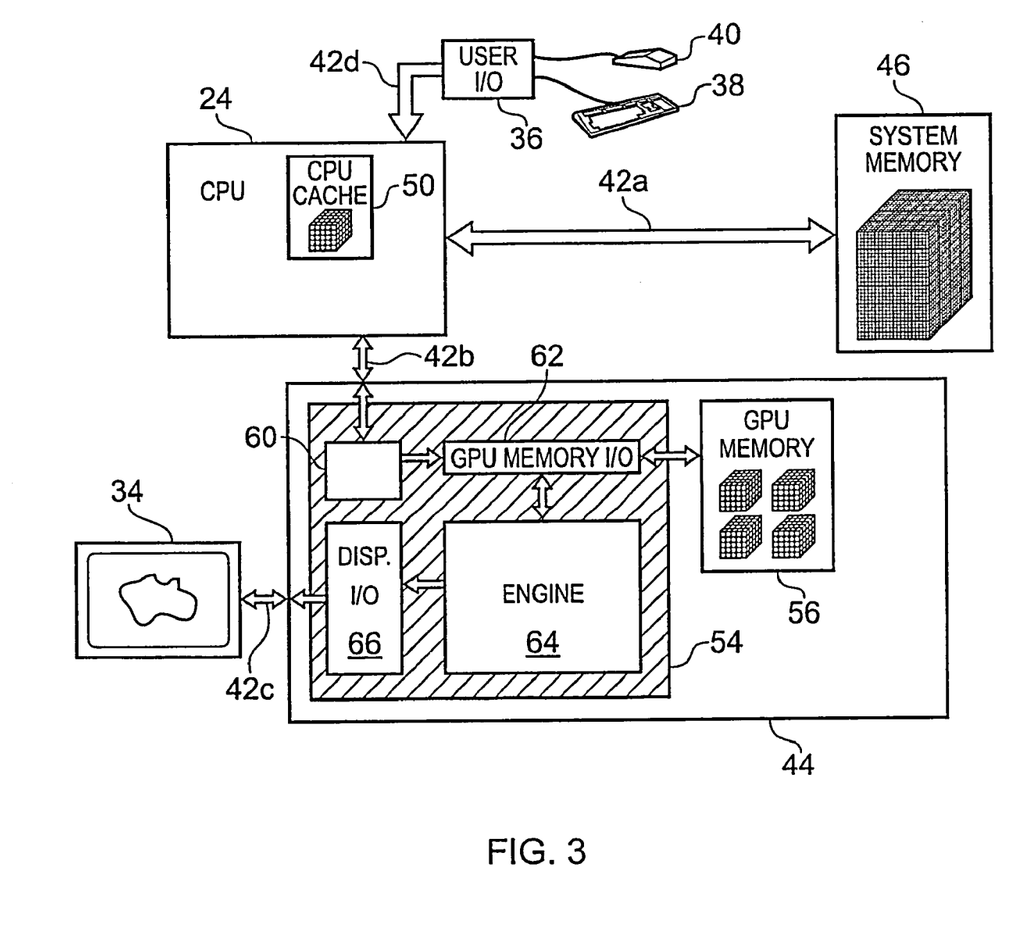
FIG. 3 schematically shows some of the features of the computer system of in FIG. 2 in more detail.

FIG. 3 schematically shows some of the features of the computer system shown in FIG. 2 in more detail. The RAM 28 and hard disk drive 30 are shown collectively in FIG. 3 as a system memory 46. Volume data 48 obtained from the scanner 2 shown in FIG. 1 is stored in the system memory as shown schematically in the figure.

To assist in showing the different data transfer routes between features of the computer system 22, the common bus 42 shown in FIG. 2 is schematically shown in FIG. 3 as a series of separate bus connections 42a-d. A first bus connection 42a connects between the system memory 46 and the CPU 24. A second bus connection 42b connects between the CPU 24 and the graphics card 44. A third bus connection 42c connects between the graphics card 44 and the display 34. A fourth bus connection 42d connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with 3D rendering.

The user defines the required parameters using the keyboard 38 and mouse 40 in combination with a menu of options displayed on the display 34, for example using conventional techniques.

Figure 4:
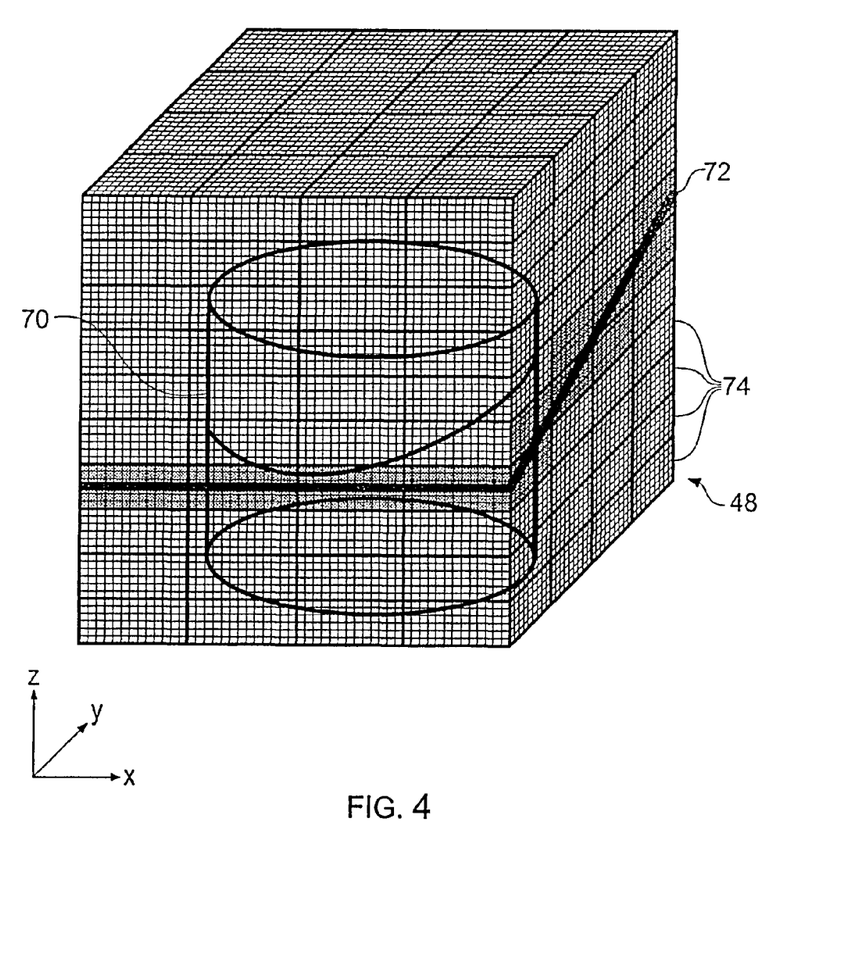
FIG. 4 schematically shows a region of space represented by volume data.

FIG. 4 schematically shows the region of space represented by the volume data 48. In this example, a cylinder 70 has been imaged. The alignment of the volume data with the x-, y- and z-axes is as indicated in the lower left-hand corner of the figure. The position and orientation of the intersection of an example MPR slab with the outer faces of the volume data 48 is indicated by reference numeral 72. The intersection of the MPR slab with the cylinder is also schematically shown. Dark shading is used to mark the blocks that contain voxels that intersect the MPR plane. The volume data 48 are illustrated as being divided into a number of notional blocks of voxels as indicated by the heavy-line gridding. The light-line gridding represents the individual voxels. Blockwise processing of voxels is advantages for some hardware and software platforms, in particular when GPU's are used for the rendering, but this is not related to the subject matter of the present invention. The present invention may also be applied when the voxels are handled as a single data set without any subdivision into blocks. It will be appreciated that the gridding shown is schematic and not all gridding lines corresponding to all voxels and blocks are shown in the interest of clarity.

In each frame of the 4D cine, the task of the computer system 22 is to render and display an image corresponding to the MPR slab defined for that frame. The slab is set to have a certain thickness, which may be defined by the user or preset by the system. A suitable slab thickness could be in the region of 1 to 10 mm, for example 5 mm (corresponding to ten voxels depth with current state of the art scanners), depending on the depth of the feature which is to be visualized and other relevant factors such as the expected effect of any natural or artificial contrast agents. While the slab thickness is variable, it is noted that, according to the implementation of the invention described below, the MPR slab position and orientation and set automatically.

Having now described the hardware and software environment in general terms we now describe the subject matter of the invention.

The detailed implementations of the invention described below relate to cardiac CT(A) data, i.e. 3D X-ray image data of the heart. To provide contrast for the X-rays, the blood is typically dyed with an agent having higher stopping power than the surrounding tissue. Iodine is a common staining agent used for this purpose. The following description presupposes that a 4D CT cardiac data set has been collected from a patient using a suitable CT scanner, and is stored in system memory.

The visualization method thus commences with loading the 4D data set into CPU memory, and then carrying out the processing according to the invention as now described.

Figure 5:
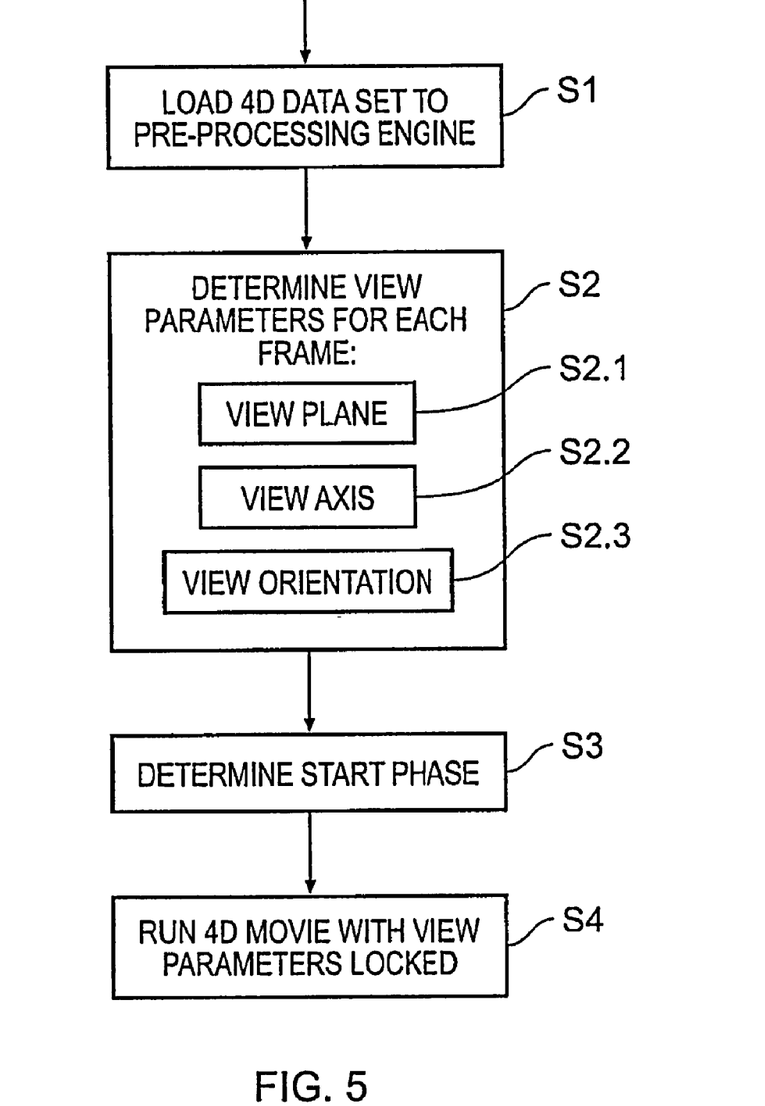
FIG. 5 is a flow diagram of the basic process steps of a visualization method embodying the invention.

FIG. 5 is a flow diagram of the basic process steps of the visualization method.

Step S1 is to load the multiple cardiac phases, i.e. the volume data for each of the frames of the time sequence, from system memory into a lower latency CPU memory.

Step S2 is to pre-process the volume data in order to determine the viewing parameters of view plane, view axis and view orientation, in sub-steps S2.1, S2.2 and S2.3 respectively, for each of the frames, where these view parameters are referenced to the heart feature of interest, for example the aortic valve or the mitral valve. Another example would be to monitor the wall of the aorta to view its pulsatile motion. This pre-processing can be carried out independently on the image data contained within each frame, so that the viewing parameters of a particular frame are determined by analyzing that image data from that frame only. This is referred to as running a single phase pre-processing on every available frame. However, this may result in jumps when the movie is played and is also computationally quite intensive. Instead, it is preferred that pre-processing is based on determining the view parameters from analyzing the image data from a single frame, and then carrying out a registration process involving the other frames in order to determine the view parameters for those other frames. The single frame used to determine the view parameters, referred to as the reference frame in the following, is preferably selected to be the most appropriate frame in relation to its phase of the heart beat, typically when the feature of interest is as still as possible and in a well defined condition. For showing a movie of the aortic valve, the most appropriate phase is probably when the valve leaflets are closed, i.e. diastolic. The reference frame can be found by looking for the most-pronounced tri-star shape in the valve plane, as described in more detail further below. Registration is a generally known process in medical imaging whereby one set of volume data is warped to another set of volume data of the same patient data taken at a different time or with a different modality, so that a one-to-one mapping between features in one volume can be made to the same features in another volume. The registration process used in present implementations of the invention is a non-rigid registration process based on the method described in "Information Theoretic Similarity Measures in Non-Rigid Registration" Crum, Hill and Hawkes, Proceedings of Information Processing in Medical Imaging 2003, LNCS 2732, pages 378-387 [5]. The domain for the registration may be the whole image domain, or may be restricted to a sub-region of the volume data. The sub-region may be the heart, as defined by thresholding the (iodine stained) blood pool, or it may be a more localized region around the feature of interest, such as the region of a particular valve. It will be understood that from the reference frame, the registration allows warping or propagating to the other frames, so that changes in the viewing parameters, namely view plane, view axis and view orientation, can be tracked throughout the phases.

Step S3 is to determine the starting frame of the movie, which for the aortic valve will usually be a frame in which the valve leaflets are closed. This step is optional. For example, it may be desirable to loop the movie so that a single heart beat is repeatedly displayed in which case the starting frame is arbitrary.

Step S4 is to render and display the movie by rendering each of the frames of volume data with the viewing parameters computed in Step S2 during the pre-processing, and displaying the rendered frames as a movie on the display. The data is thus dynamically moved in the fourth dimension while keeping the valve plane static to the viewer. The opening and closing of the valve can then be viewed without distracting the eye by non-relevant translational, tilting and twisting movement. It will be understood that if slab MPR is used then the view plane will typically be chosen to be in the middle of the slab, although it could define the upper or lower slab planes, or some other position within the thickness of the slab, if desirable for viewing. The viewing plane is thus effectively locked to the valve plane in all phases during viewing. The viewing axis is centered on the valve. Further, the viewing orientation is kept aligned to the orientation of a particular feature, such as setting the 12 o'clock position, i.e. vertical viewing direction in the display, as the direction from the center of the aorta towards the most anterior of the aortic sinuses.

These principal steps are now described in more detail with reference to further figures.

Figure 6:
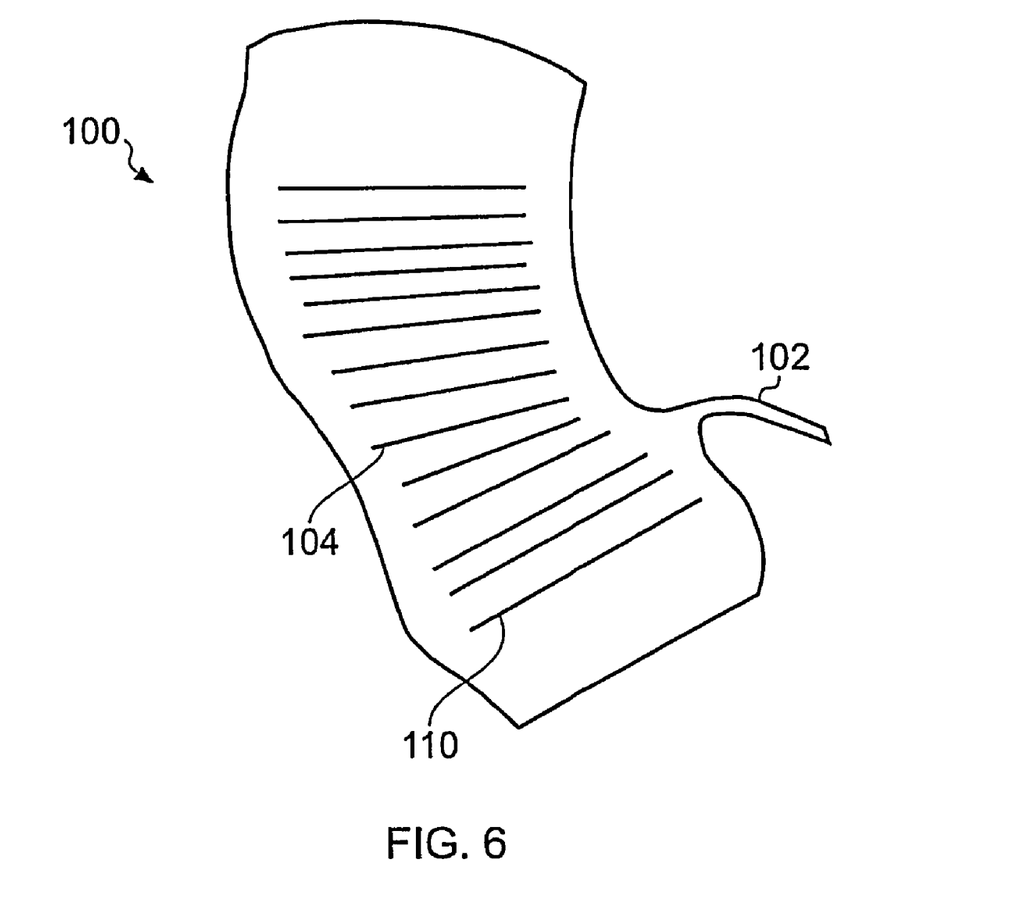
FIG. 6 shows a segment of the aorta including the aortic sinuses together with a set of notional planes used in the processing.

FIG. 6 shows a segment of the anterior or ascending aorta 100, and is used to describe in more detail the first parts of Step 2.1 of the process flow described above, this step being the step of automatically determining the aortic valve plane. In the figure, the aortic sinuses are visible near the base of the illustrated segment by the broadening of the profile. One of the pulmonary arteries 102 is also visible emerging from its ostium. Overlaid on the image of the aorta are a series of planes 104 used in the numeric processing to find automatically the plane of the aortic sinuses, i.e. the plane of the aortic valve, 110.

The initial steps in this processing are as follows:
A. A binary thresholding of the volume is first undertaken based on the contrast agent in order to identify the heart volume.
B. Structures in the upper transversal planes of the thresholded volume are then identified using morphological erosion of the slice features.
C. Two circular structures are then identified, which are taken to be sections through the descending and ascending aorta.
D. The ascending aorta, i.e. the aortic root, is identified as the anterior one of these two circular structures.
E. Starting from proximate the aortic arch, the thresholded volume is sliced in steps going downwards (see FIG. 6). At each step the area, or radius, of each slice is determined until the size is higher than a given threshold, which indicates that the left ventricle, i.e. the chamber into which the aorta opens out, has been reached. This defines the lower bound of the search volume.
F. The slices are then searched through to find a local maximum in size which is determined to be the region of the aortic sinuses.
G. The valve plane is then found within the aortic sinus region as now described with reference to the following figure.

The aorta tracking method of Step E is now described in further detail:
i. From a given start point and a start orientation (i.e. a direction vector or normal vector perpendicular to the start plane) and a given 3D domain (we use this term to describe a subset of voxels of a given rasterized volume, e.g. the thresholded blood pool), find the intersection of this plane with the 3D domain. This forms a slice, a 2D domain.
ii. Reduce this slice to the part of this domain connected to the start point
iii. Find the center of gravity of this part.
iv. Define the direction of the next slice by calculating a weighted average of the previous slice normal vector and the vector between the previous center point and the center of gravity of this new slice. This allows the algorithm to slice approximately perpendicular along a curved tubular object like the aortic root.
v. Shift this point forward with a small step size (e.g. 2 mm) in this direction to create the next slice.

Steps 'ii' to 'v' are then repeated until one of the following criteria is true:
1. The distance from the start point is too high (i.e. higher than a predefined threshold value).
2. The center of gravity of the new slice is too far away from the previous one.
3. The maximum diameter of the new slice is much smaller or much higher than the previous one.
4. The slice is empty, i.e. the domain has been sliced until the end.

Figure 7A:
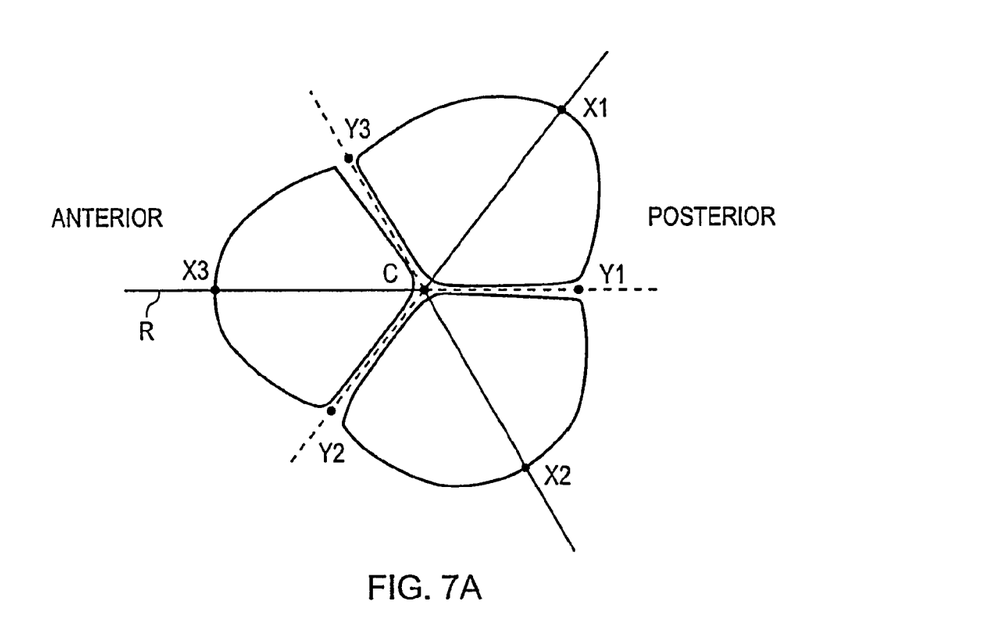
FIG. 7A is a schematic plan view of the aortic sinuses with the leaflets closed.

FIG. 7A is a schematic plan view of the aortic sinuses in a phase in which the leaflets are closed (diastole). Numeric processing based on this view is performed to complete Step 2.1 and also to perform Steps 2.2 and 2.3, namely center determination (for defining the view axis) and orientation determination (for determining the view orientation).

This figure shows the result of the binary thresholding in the region of the aortic sinuses close to the aortic valve plane As shown in the sketch the aortic valve, which is tricuspid, has a shape defined by three lobes with approximately 3-fold rotational symmetry about an axis perpendicular to the valve plane. Where adjacent leaflets touch each other, a kind of tri-star or shamrock/clover shape is formed with the apex defining the center of the structure (dashed lines). This center is the point used as the intersection point of the view axis for the rendering and the view plane.

It is seen that the radial extent of the leaflets from the center point has its minimum along the tri-star lines and its maximum at intermediate angles (solid lines). These geometric features are used in the numeric processing to set the valve plane, since this is deemed to be where the difference between these radial distances is most pronounced, i.e. the aggregate difference between the 3 maxima and 3 minima is largest. Referring to the figure, each of the distances X1-C, X2-C and X3-C are summed and subtracted by the distances Y1-C, Y2-C and Y3-C, and the slice having the maximum of this difference is taken as the valve plane. The method successfully arrives at the valve plane which is the plane through the thickest part of the aortic sinuses, parallel to the three leaflets of the aortic valve, by analyzing slices around the aortic sinuses to find the one with the most prominent "shamrock".

The "shamrock" features are also used to fix the view orientations. Namely, the view orientation is fixed at the most anterior of the three leaves of the "shamrock" as illustrated in the figure, i.e. along reference line R defined by points X3 and C. When showing the movie, the orientation from frame-to-frame is held along this line so that twisting in the aorta does not cause rotational instability in the image.

Figure 7B:
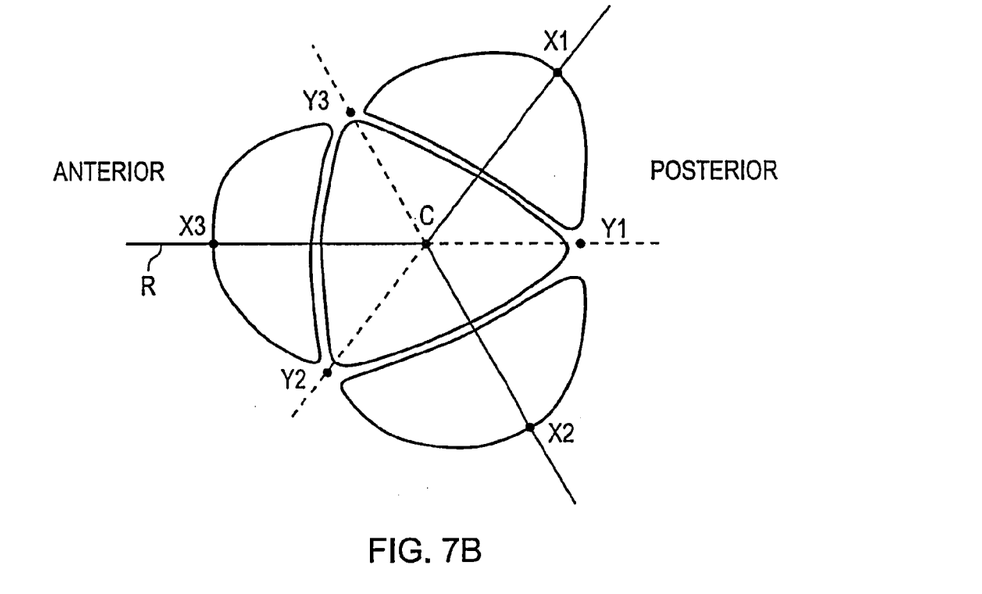
FIG. 7B is a schematic plan view of the aortic sinuses with the leaflets open.

FIG. 7B is a schematic plan view of the aortic sinuses with the leaflets open and is provided for comparison with FIG. 7A. It can be seen that the "tri-star" shape of the closed leaflets is now replaced with a triangular shape indicative of the opening.

Figure 8:
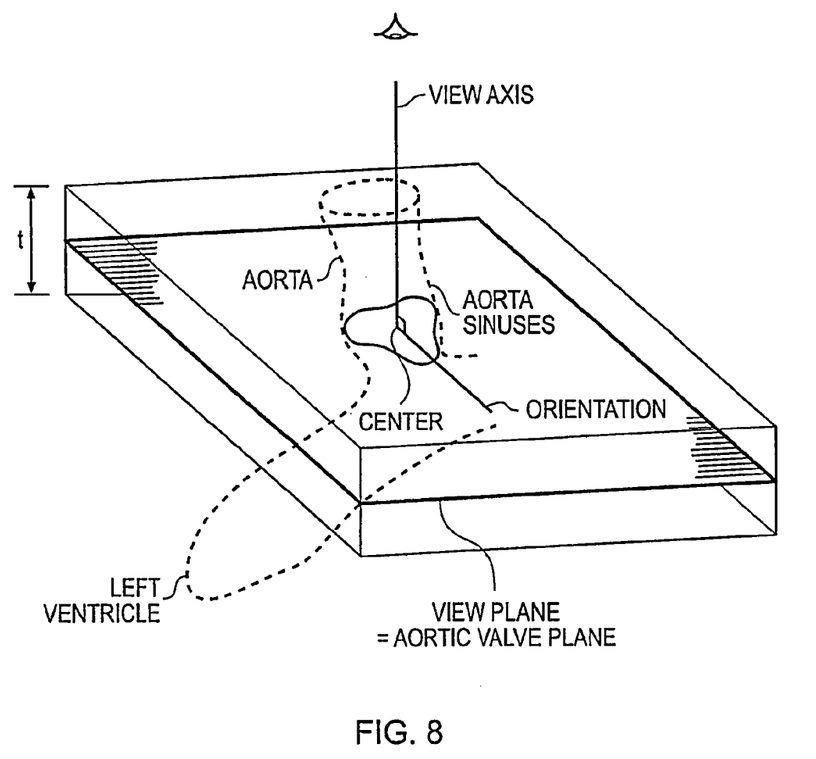
FIG. 8 is a schematic perspective view showing the section made by the aortic sinuses in the viewing plane in relation to the main heart features (shown dotted) and the geometrical constructs relevant to the 4D slab MPR.

FIG. 8 is a schematic perspective view showing the section made by the aortic sinuses in the viewing plane in relation to the main heart features of the aorta and left ventricle (shown dotted) and the geometrical constructs relevant to the 4D slab MPR. This figure provides a summary of what has been described above with reference to FIGS. 5, 6, 7A and 7B. A slab of thickness 't' centered around the view plane, i.e. the plane of the aortic valve, is shown. In the view plane, a sketch of the outline of the aortic sinuses is shown, with its cloverleaf shape evident. The view axis is illustrated, which is perpendicular to the view plane and intersects the view plane at the center of the section of the aortic sinuses in the view plane. In addition, the view orientation is aligned with the illustrated axis in the view plane.

Figure 9:
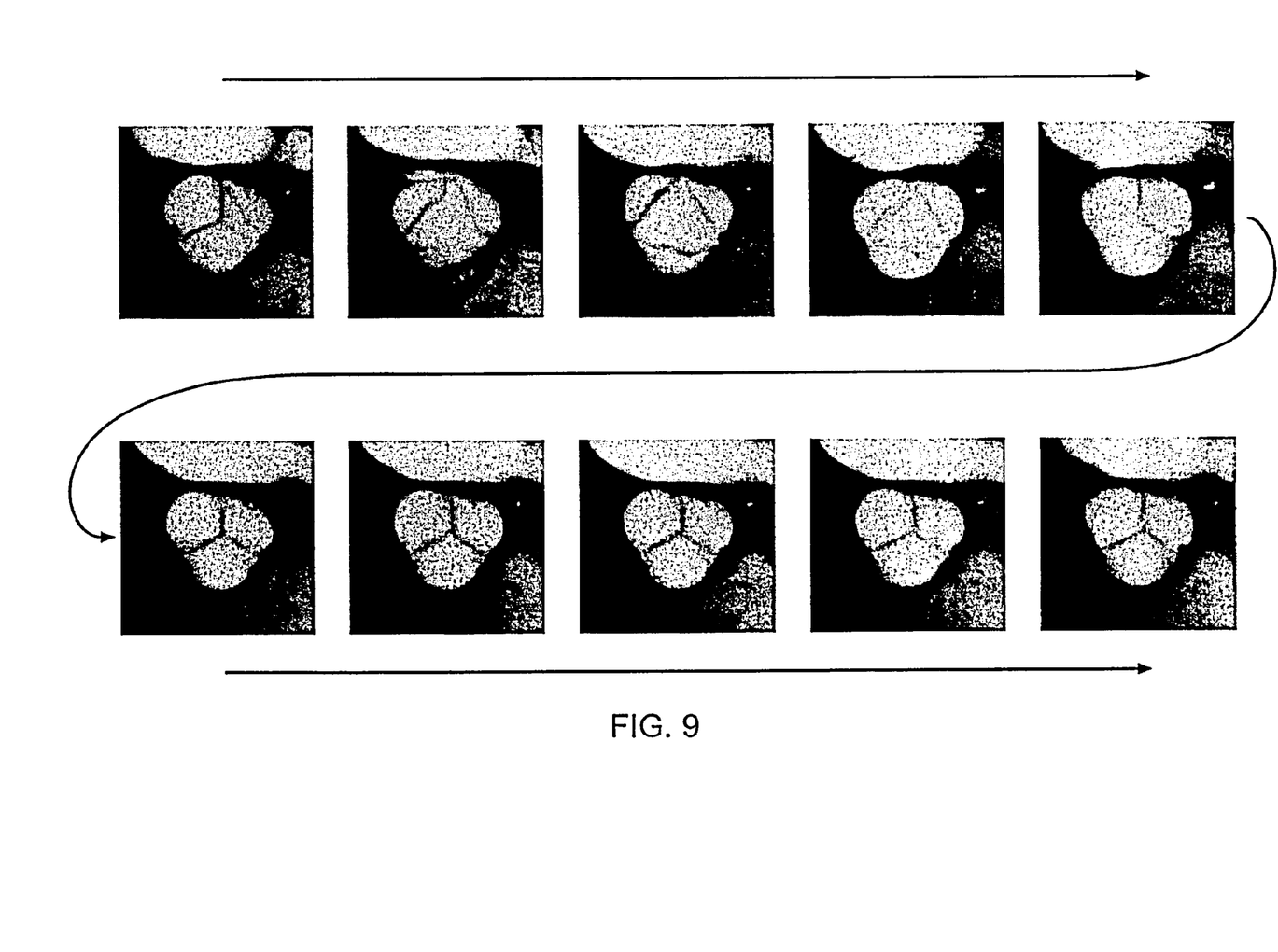
FIG. 9 shows ten frames of an example 4D slab MPR cine of the aortic valve covering a full heart cycle or beat.

FIG. 9 shows ten frames of an example 4D slab MPR cine of the aortic valve covering a full heart cycle or beat as visualized according to the above-described method. The sequence starts with the valve leaflets closed, and progresses to a fully open condition in the fourth frame, whereafter the leaflets close again. The start phase with the valve closed is determined by comparing the cloverleaf sections for all frames to ascertain where the cloverleaf shape is most pronounced, i.e. the aggregate difference between the 3 maxima and 3 minima is largest. Referring to the FIGS. 7A and 7B, each of the distances X1-C, X2-C and X3-C are summed and subtracted by the distances Y1-C, Y2-C and Y3-C, and the slice having the maximum of this difference is taken as the valve plane.

Having now described visualization of the aortic valve, it is now described how the method can be extended to visualize the initial valve, which is a bicuspid valve.

Figure 10:
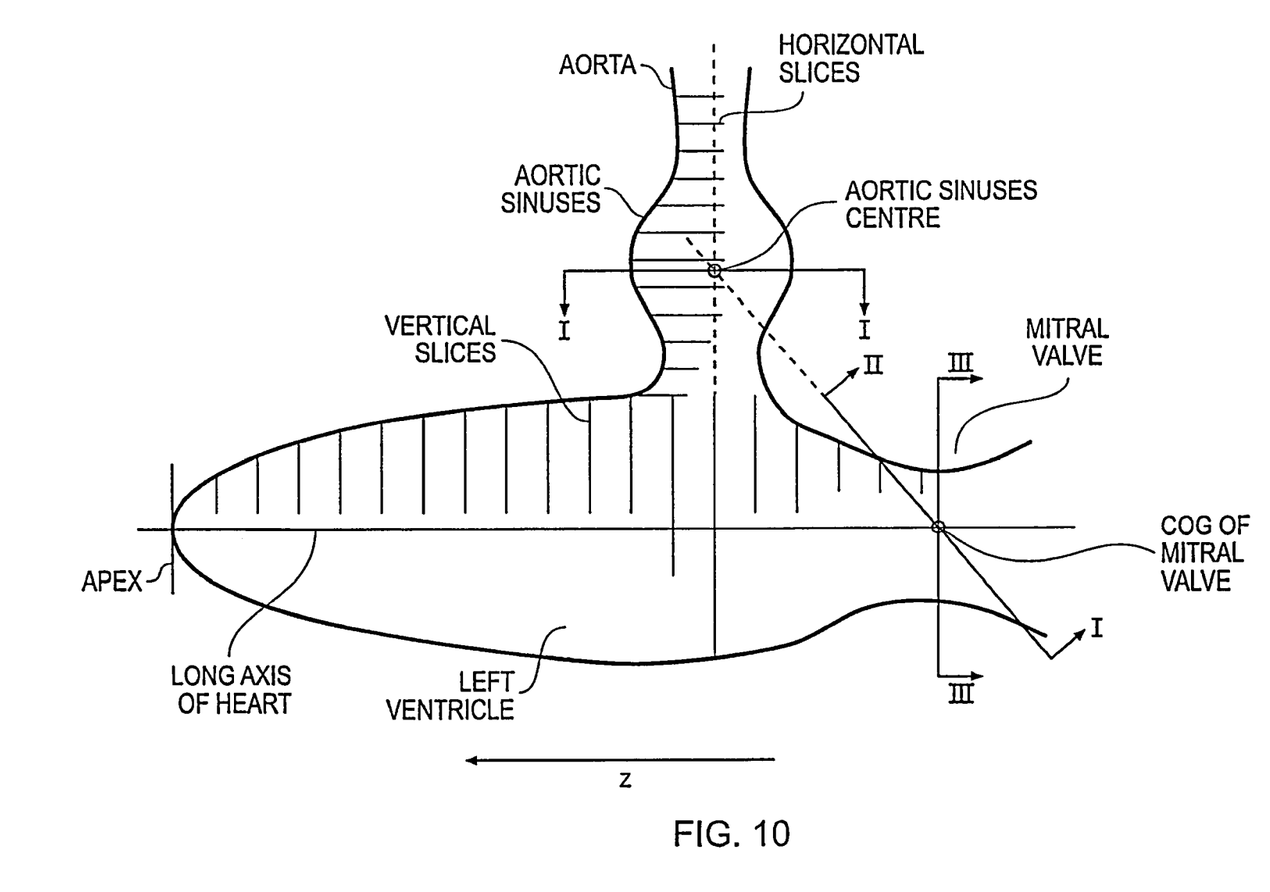
FIG. 10 is a schematic section showing how the mitral valve plane is located.

FIG. 10 is a schematic section showing how the mitral valve plane is located. It also shows the view plane for the aortic valve of the above described example, this being labeled Section I-I in the figure.

A) Slicing further forward in the direction given by the aortic valve plane in the thresholded volume 7A, until the diameter of the slices is so high that it can be assumed that the left ventricle has been reached.

B) Using this aortic boundary plane, the aortic root is "cut off" from the left ventricle to bound the left ventrical volume for the subsequent numeric processing.

C) Slicing the remaining blood pool volume (which contains much more than just the left ventricle) downwards in the z direction (towards the feet of the patient) until the end of the blood pool volume is reached. This point demarcates the apex of the left ventricle.

D) Finding the principal axis of the blood pool above this apex, e.g. by PCA.

E) Slicing upwards along this principal axis roughly starting at the height of the aortic valve until a high diameter has been reached.

F) Finding a local minimum of the diameter of all these slices and choosing the one with the smallest diameter (i.e. looking for the waist in an hour glass shape) where this waist is taken to mark the mitral valve plane.

G) The center of gravity of this waist slice is then determined and taken as the view axis intersection point with the view plane.

H) The mitral valve view plane is taken to be the waist plane and is used as the view plane as shown by Section III-III in FIG. 10.

I) The vertical, i.e. 12 o'clock, view orientation is taken to be the projection of a line from the centre of gravity (COG) of the mitral valve waist plane to the center of the aortic valve plane as determined according to the method described further above onto the mitral valve view plane.

The above described steps are preferably carried out using a frame in which the left ventricle is full, and then the above-referenced non-rigid registration process is used to propagate the view parameters to the other frames.

Similarly to the aortic valve example, the result is a view plane, differently oriented in all phases and in a different position in all phases, where the viewer's perspective is "locked" to the mitral valve, always centered on the mitral valve center, and in all phases having the same view orientation.

Alternatively, other view planes for the mitral valve may be selected instead of the waist plane (or a plane containing the line between the waist center and the aortic valve center—as indicated by Section II-II in FIG. 10) intended to track the mitral valve plane. For example a plane perpendicular to the mitral valve plane may provide a useful visualization, where this plane may be oriented so that the above mentioned line connecting the aortic and mitral valve COG's lies in it. More specifically, after having found the local shape of the thresholded blood pool in order to find the constriction between left ventricle and left atrium, other criteria can be used to refine the position and the orientation of the view plane, e.g. the shape of the slice at the waist position, or the gray value distribution in a local neighborhood of this plane, which could be derived from a model, created from a training data set of manually analyzed data.

Methods embodying the invention will often be used within a hospital environment. In this case, the methods may usefully be integrated into a stand-alone software application, or with a Picture Archiving and Communication System (PACS). A PACS is a hospital-based computerized network which can store volume data representing diagnostic images of different types in a digital format organized in a single central archive. For example, images may be stored in the Digital Imaging and Communications in Medicine (DICOM) format. Each image has associated patient information such as the name and date of birth of the patient also stored in the archive. The archive is connected to a computer network provided with a number of workstations, so that users all around the hospital site can access and process patient data as needed. Additionally, users remote from the site may be permitted to access the archive over the Internet.

In the context of the present invention, therefore, a plurality of image volume data sets can be stored in a PACS archive, and a computer-implemented method of generating movies or other output images of a chosen one of the volume data sets according to embodiments of the invention can be provided on a workstation connected to the archive via a computer network. A user such as a radiologist, a consultant, or a researcher can thereby access any volume data set from the workstation, and generate and display movies or other images, such as a stills image of a heart feature at a particular phase of interest, using methods embodying the invention.

Figure 11:
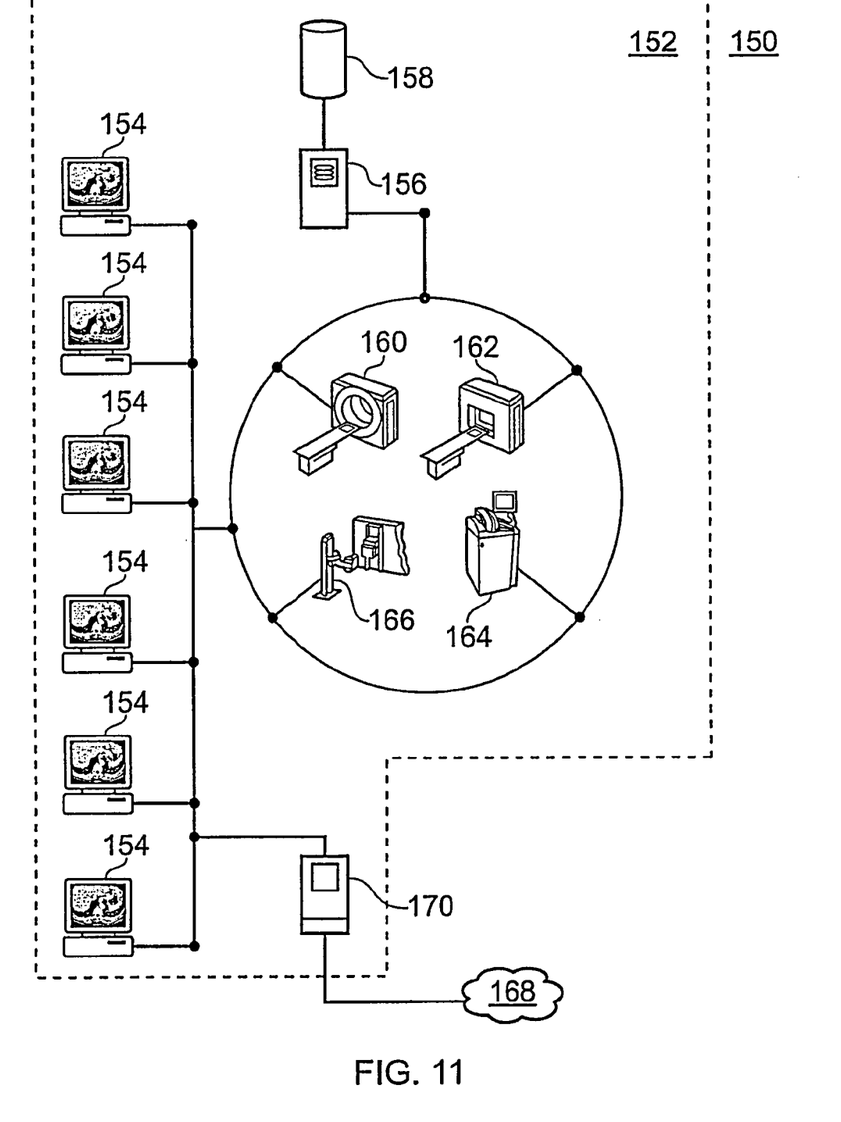
FIG. 11 shows an example computer network which can be used in conjunction with embodiments of the invention.

FIG. 7 shows an example computer network which can be used in conjunction with embodiments of the invention. The network 150 comprises a local area network in a hospital 152. The hospital 152 is equipped with a number of workstations 154 which each have access, via the local area network, to a hospital computer server 156 having an associated storage device 158. A PACS archive is stored on the storage device 158 so that data in the archive can be accessed from any of the workstations 154. One or more of the workstations 154 has access to a graphics card and to software for computer-implementation of methods of generating images as described hereinbefore. The software may be stored locally at the or each workstation 154, or may be stored remotely and downloaded over the network 150 to a workstation 154 when needed. In other example, methods embodying the invention may be executed on the computer server with the workstations 154 operating as terminals. For example, the workstations may be configured to receive user input defining a desired volume data set and cine parameters and to display resulting images while the volume rendering itself is performed elsewhere in the system. Also, a number of medical imaging devices 160, 162, 164, 166 are connected to the hospital computer server 156. Volume data collected with the devices 160, 162, 164, 166 can be stored directly into the PACS archive on the storage device 156. Thus a cine of patient images can be generated and viewed immediately after the corresponding volume data are recorded, so that a swift diagnosis can be obtained in the event of medical emergency. The local area network is connected to the Internet 168 by a hospital Internet server 170, which allows remote access to the PACS archive. This is of use for remote accessing of the data and for transferring data between hospitals, for example, if a patient is moved, or to allow external research to be undertaken.

In the described embodiments, a computer implementation employing computer program code for storage on a data carrier or in memory can be used to control the operation of the CPU and GPU of the computer system. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

It will be appreciated that although particular embodiments of the invention have been described, many modifications/additions and/or substitutions may be made within the scope of the present invention. Accordingly, the particular examples described are intended to be illustrative only, and not limitative. In particular, it will be understood that references to an MPR plane should not be construed to be limited to a flat plane, but should also include an arbitrary shape of plane. For example, non-flat planes are commonly used in curved MPR.

REFERENCES

[1] Lichtenbelt, B., Crane, R. and Naqvi, S., "Introduction to Volume Rendering", Hewlett-Packard Company, Prentice-Hall PTR, New Jersey, 1998
[2] EP 1 832 233 A1
[3] US 2005/0281447 A1
[4] JP 2002-140690
[5] "Information Theoretic Similarity Measures in Non-Rigid Registration" Crum W. R., Hill D. L. G. H. and Hawkes D. J., Proceedings of Information Processing in Medical Imaging 2003, LNCS 2732, pp. 378-387, ISBN 3-540-40560-7, ISSN 0302-9743, Editors, C. Taylor and J. A. Noble

What is claimed is:

1. A computer implemented method of volume rendering a sequence of frames over time of volume data depicting heart motion, the method comprising:
defining a heart feature of interest to view;
pre-processing each of the frames of volume data to determine a view plane for each frame referenced on the heart feature of interest;
rendering each of the frames of volume data with a viewing axis locked to its respective view plane determined by the pre-processing; and
displaying the rendered frames as a movie where the frames are displayed referenced to the view axis.

2. The method of claim 1, wherein the pre-processing of each frame also determines a center point in the view plane for the heart feature of interest, and wherein when rendering each frame the view axis is locked to intersect the view plane at the center point.

3. The method of claim 1, wherein the pre-processing of each frame also determines a view orientation in the view plane for the heart feature of interest, and wherein when rendering each frame the view axis is locked to the view orientation.

4. The method of claim 1, wherein the pre-processing of each frame also determines a center point and a view orientation in the view plane for the heart feature of interest, and wherein when rendering each frame the view axis is locked to intersect the view plane at the center point and also locked to the view orientation.

5. The method of claim 1, wherein the view planes for the frames are determined for each frame independently of the other frames with reference to the volume data for that frame.

6. The method of claim 1, wherein the view plane is first determined for a frame selected having regard to phase of the feature or interest in the heart cycle, and then the view planes for the other frames are determined through a registration process.

7. The method of claim 1, wherein the heart feature of interest is automatically located with reference to a generally tubular structure of the heart, with the view plane being determined with reference to a geometrical feature of the generally tubular structure.

8. The method of claim 1, wherein the heart feature of interest is a valve.

9. The method of claim 8, wherein a preferred start frame of the movie is selected by determining a frame in which the valve is closed, the start frame being determined from establishing a maximum deviation from a circular shape of the feature in the view plane.

10. The method of claim 8, wherein the valve is the aortic valve.

11. The method of claim 10, wherein the view plane is located at the plane of the aortic sinuses, which is found by finding a slice through the anterior aorta between the aortic arch and the aortic valve and then slicing down towards the aortic valve, with the slices following the curvature of the aorta, until a maximum in the slice area is found.

12. The method of claim 11 when dependent on claim 3, wherein the view orientation is determined by a line from the center point of the aortic sinuses and the radial direction of extent of a selected one of the aortic sinuses.

13. The method of claim 8, wherein the valve is the mitral valve.

14. The method of claim 13, wherein the view plane is found by:
   finding a slice through the aorta between the aortic arch and the aortic valve and then iteratively slicing down towards the aortic valve, with the slices following the curvature of the aorta, until the slices rapidly increase in area indicating entrance of the left ventricle;
   finding a slice through the left ventricle transverse to the final aortic slice and slicing down the left ventricle in a direction towards the patient's feet until the apex is found;
   slicing back up the left ventricle past the aorta until a minimum in the slice area is found, and finding the center of gravity of this slice which indicates the center of the mitral valve;
   defining the view plane as a plane containing the center of the mitral valve.

15. The method of claim 1, wherein the rendering is multiplanar reformatting (MPR).

16. The method of claim 15, wherein the MPR is slab MPR using a slab having an extent covering a range of distances above and below the view plane.

17. A computer program product comprising a non-transitory computer readable medium including machine readable instructions for implementing the method of claim 1.

18. A computer configured to perform the method of claim 1.

19. A computer system loaded with machine readable instructions for implementing the method of claim 1.

20. An apparatus for volume rendering a sequence of frames over time of volume data depicting heart motion, the apparatus comprising: a central processing unit (CPU) coupled to a system memory storing the volume data; and a display, wherein the apparatus is operable to:
   (a) define a heart feature of interest to view;
   (b) load the volume data from system memory;
   (c) pre-process each of the frames of volume data using the CPU to determine a view plane for each frame referenced on the heart feature of interest;
   (d) render each of the frames of volume data with a viewing axis locked to its respective view plane determined by the pre-processing using the CPU; and
   (e) display the rendered frames as a movie on the display where the frames are displayed referenced to the view axis.

21. The apparatus of claim 20, wherein the pre-processing of each frame also determines a center point in the view plane for the heart feature of interest, and wherein when rendering each frame the view axis is locked to intersect the view plane at the center point.

22. The apparatus of claim 20, wherein the pre-processing of each frame also determines a view orientation in the view plane for the heart feature of interest, and wherein when rendering each frame the view axis is locked to the view orientation.

23. The apparatus of claim 20, wherein the pre-processing of each frame also determines a center point and a view orientation in the view plane for the heart feature of interest, and wherein when rendering each frame the view axis is locked to intersect the view plane at the center point and also locked to the view orientation.

24. A computer implemented method of volume rendering a plurality of sets of volume data depicting a heart, the method comprising:
   defining a heart feature of interest to view;
   pre-processing each of the sets of volume data to determine a view plane for each frame referenced on the heart feature of interest;
   rendering each of the frames of volume data with a viewing axis locked to its respective view plane determined by the pre-processing; and
   displaying the rendered frames together to allow their comparison where the frames are displayed referenced to the view axis.

* * * * *